United States Patent
Stracca et al.

(10) Patent No.: US 12,418,353 B2
(45) Date of Patent: Sep. 16, 2025

(54) TRANSMITTING AND RECEIVING SYNCHRONIZATION DATA

(71) Applicant: Telefonaktiebolaget LM Ericsson (publ), Stockholm (SE)

(72) Inventors: Stefano Stracca, Pisa (IT); Fabio Cavaliere, Pisa (IT); Paolo Debenedetti, Genoa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 304 days.

(21) Appl. No.: 17/632,615

(22) PCT Filed: Aug. 12, 2019

(86) PCT No.: PCT/EP2019/071538
§ 371 (c)(1),
(2) Date: Feb. 3, 2022

(87) PCT Pub. No.: WO2021/028014
PCT Pub. Date: Feb. 18, 2021

(65) Prior Publication Data
US 2022/0286220 A1    Sep. 8, 2022

(51) Int. Cl.
*H04J 3/16*    (2006.01)
*H04L 7/00*    (2006.01)

(52) U.S. Cl.
CPC .......... *H04J 3/1658* (2013.01); *H04L 7/0075* (2013.01)

(58) Field of Classification Search
CPC ............................ H04J 3/1658; H04L 7/0075
See application file for complete search history.

(56) References Cited

U.S. PATENT DOCUMENTS

| | | | | |
|---|---|---|---|---|
| 2018/0375800 | A1* | 12/2018 | Gareau | .......... H04L 49/35 |
| 2019/0199505 | A1* | 6/2019 | Zhang | .......... H04J 3/065 |
| 2019/0356501 | A1* | 11/2019 | Liu | .......... H04L 47/803 |

FOREIGN PATENT DOCUMENTS

EP    3509245 A1    7/2019

OTHER PUBLICATIONS

OIF, "IA Flex Ethernet 2.1 Implementation Agreement", Jul. 2019, OIFORUM (Year: 2019).*
International Search Report and Written Opinion dated May 15, 2020 for International Application No. PCT/EP2019/071538 filed Aug. 12, 2019, consisting of 10 pages.
OIF "IA Flex Ethernet 2.1 Implementation Agreement" IA # OIF FLEXE-02.1; Fremont, CA, Jul. 2019, consisting of 56 pages.
International Telecommunication Union SG15-C1490; Title: Proposal for MTN synchronization; Source: China Mobile Communications Corporation; Purpose: Proposal; Location and Date: Geneva, Jul. 1-12, 2019, consisting of 2-pages.

(Continued)

*Primary Examiner* — Pranesh K Barua
(74) *Attorney, Agent, or Firm* — Weisberg I.P. Law, P.A.

(57) ABSTRACT

Methods and apparatus are provided for transmitting synchronization data over a FlexE communications link. In an example aspect, a method of transmitting synchronization data over a FlexE communications link includes, in response to a synchronization event, selecting a next slot of the FlexE communications link that is unallocated or is allocated to a FlexE client, and transmitting synchronization data associated with the synchronization event in the selected slot.

11 Claims, 5 Drawing Sheets

(56) References Cited

OTHER PUBLICATIONS

Optical Internetworking Forum; "Flex Ethernet 2.0 Implementation Agreement" IA # OIF-FLEXE-02.0; Fremont, CA, Jun. 2018, consisting of 51 pages.
CPRI Specification V7.0; Common Public Radio Interface (CPRI); Interface Specification; Ericsson AB, Huawei Technologies Co. Ltd, NEC Corporation, Alcatel Lucent, and Nokia Networks; Oct. 9, 2015, consisting of 128 pages.

* cited by examiner

Receiving, in a slot of the FlexE communications link that is unallocated or is allocated to a FlexE client, synchronization data associated with a synchronization event — 506
500
FIG. 5
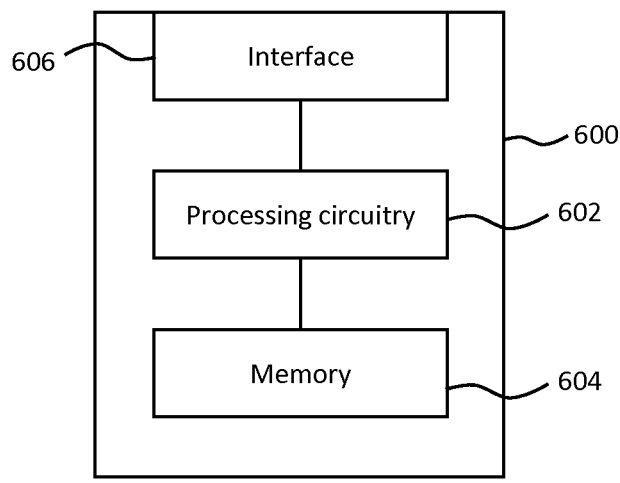
FIG. 6
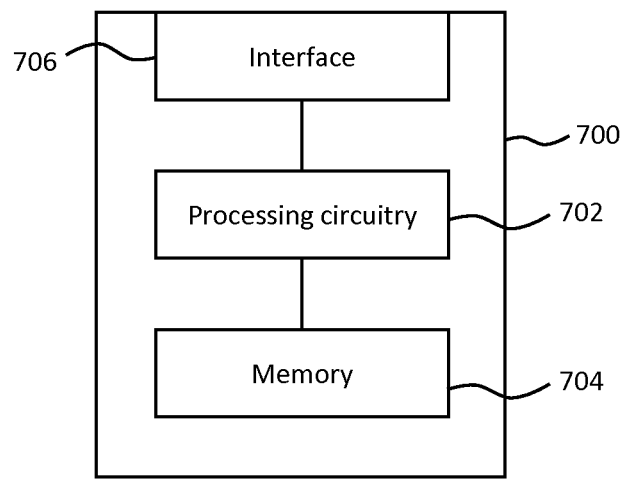
FIG. 7

TRANSMITTING AND RECEIVING SYNCHRONIZATION DATA

CROSS-REFERENCE TO RELATED APPLICATIONS

This application is a Submission Under 35 U.S.C. § 371 for U.S. National Stage Patent Application of International Application Number: PCT/EP2019/071538, filed Aug. 12, 2019 entitled "TRANSMITTING AND RECEIVING SYNCHRONIZATION DATA," the entirety of which is incorporated herein by reference.

TECHNICAL FIELD

Examples of the present disclosure relate to transmitting and receiving synchronization data, for example over a FlexE communications link.

BACKGROUND

The Flexible Ethernet (FlexE) Implementation Agreement 02.0 defined by the Optical Internetworking Forum (OIF), which is incorporated herein by reference, provides a mechanism for supporting a variety of Ethernet MAC rates that may or may not correspond to any existing Ethernet physical layer (PHY) rate. This includes MAC rates that are both greater than (through bonding) and less than (through sub-rate and channelization) the Ethernet PHY rates used to carry FlexE. A PHY is an implementation of a physical layer, such as for example an optical communications link or a wireless connection between devices. The Implementation Agreement defines FlexE Client MAC rates of 10, 40, and m×25 Gb/s, and defines that a FlexE Group may comprise 1 to n bonded Ethernet PHYs.

SUMMARY

One aspect of the present disclosure provides a method of transmitting synchronization data over a FlexE communications link. The method comprises, in response to a synchronization event, selecting a next slot of the FlexE communications link that is unallocated or is allocated to a FlexE client. The method also comprises transmitting synchronization data associated with the synchronization event in the selected slot.

Another aspect of the present disclosure provides a method of receiving synchronization data over a FlexE communications link. The method comprises receiving, in a slot of the FlexE communications link that is unallocated or is allocated to a FlexE client, synchronization data associated with a synchronization event.

A further aspect of the present disclosure provides apparatus for transmitting synchronization data over a FlexE communications link. The apparatus comprises a processor and a memory. The memory contains instructions executable by the processor such that the apparatus is operable to, in response to a synchronization event, select a next slot of the FlexE communications link that is unallocated or is allocated to a FlexE client, and transmit synchronization data associated with the synchronization event in the selected slot.

A still further aspect of the present disclosure provides apparatus for receiving synchronization data over a FlexE communications link. The apparatus comprises a processor and a memory. The memory contains instructions executable by the processor such that the apparatus is operable to receive, in a slot of the FlexE communications link that is unallocated or is allocated to a FlexE client, synchronization data associated with a synchronization event.

An additional aspect of the present disclosure provides apparatus for transmitting synchronization data over a FlexE communications link. The apparatus is configured to in response to a synchronization event, select a next slot of the FlexE communications link that is unallocated or is allocated to a FlexE client, and transmit synchronization data associated with the synchronization event in the selected slot.

Another aspect of the present disclosure provides apparatus for receiving synchronization data over a FlexE communications link, the apparatus configured to receive, in a slot of the FlexE communications link that is unallocated or is allocated to a FlexE client, synchronization data associated with a synchronization event.

BRIEF DESCRIPTION OF THE DRAWINGS

For a better understanding of examples of the present disclosure, and to show more clearly how the examples may be carried into effect, reference will now be made, by way of example only, to the following drawings in which:

FIG. 5 is a flow chart of a method of receiving synchronization data over a FlexE communications link;

FIG. 6 is a schematic of an example of apparatus 600 for transmitting synchronization data over a FlexE communications link;

FIG. 7 is a schematic of an example of apparatus 600 for receiving synchronization data over a FlexE communications link;

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Figure 1:
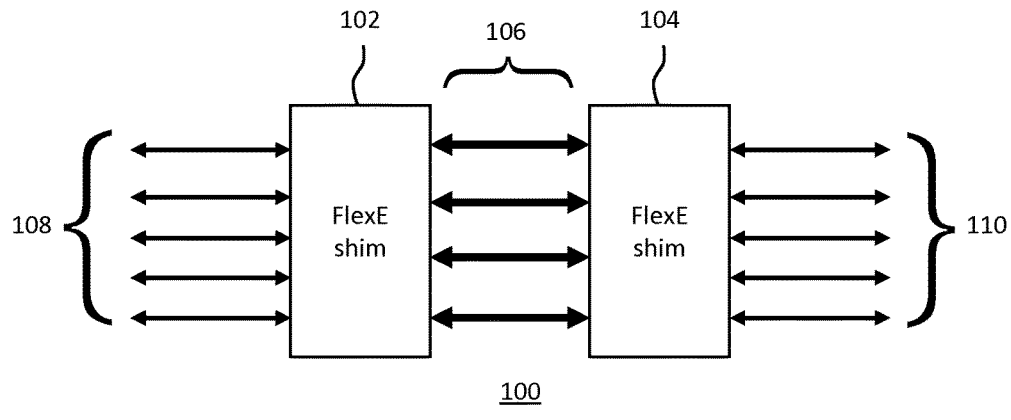
FIG. 1 is a schematic illustration of an example of a FlexE communications system.

FIG. 1 shows an example of a FlexE communications system 100. The system 100 includes a first FlexE shim 102 and a second FlexE shim 104. The FlexE shims 102 and 104 are connected by one or more communication links 106 or PHYs, collectively referred to as a FlexE group. According to the current FlexE standard (Implementation Agreement), a FlexE group may contain between 1 and 254 PHYs.

The first FlexE shim 102 is connected to a number of Ethernet clients 108. The second FlexE shim 10 is connected to the same number of Ethernet clients 110. A client 108 connected to the FlexE shim 102 has a corresponding client 110 connected to the FlexE shim 104, such that the clients may communicate via the shims and over the FlexE group 106.

Figure 2:
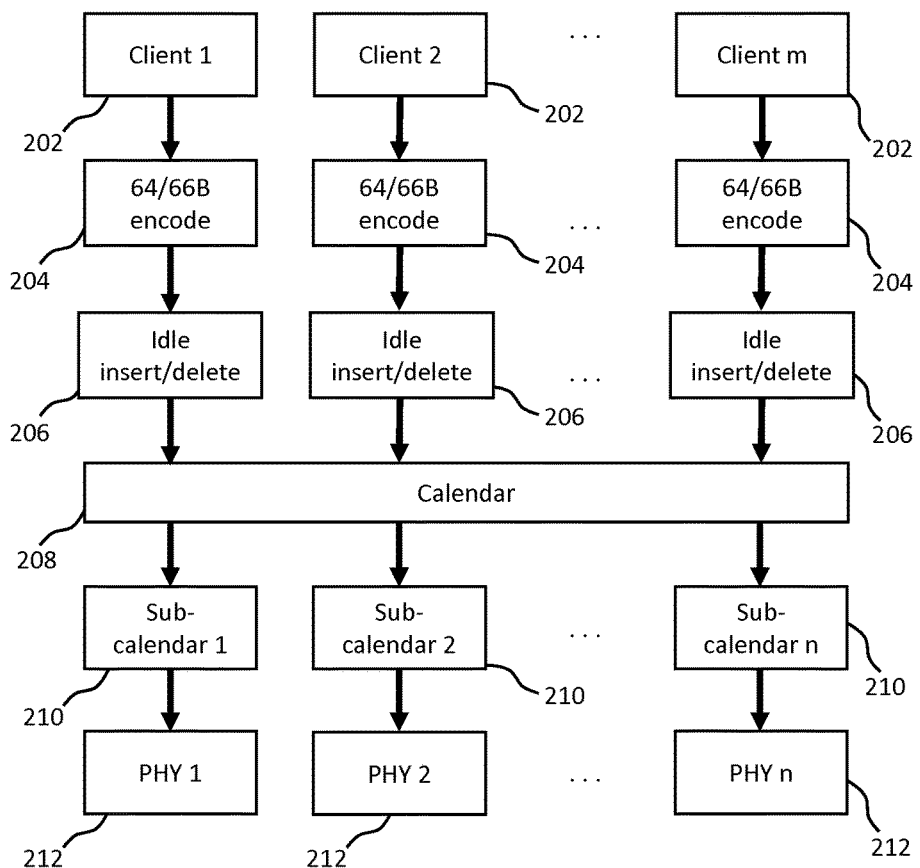
FIG. 2 is a schematic illustration of an example of functions of a FlexE multiplexer.

FIG. 2 shows an example of functions of a FlexE multiplexer (FlexE mux), one or more of which may be implemented by a FlexE shim. A plurality of FlexE clients 202 wish to transmit data to corresponding clients over a PHY or a FlexE group. Each client 202 provides data in the form of 64 bit blocks to a respective 64/66B encode block 204. Each 64/66B encode block 204 encodes 64-bit blocks of data from the respective client as 66-bit blocks, also known as Physical Coding Sublayer (PCS) blocks, and provides the 66-bit blocks to a respective idle insert/delete block 206. The idle insert/delete blocks insert 'idle' control blocks into the data stream when there is no data to transmit from the respective client, and/or when the block rate into calendar function 208 is higher than that provided by the idle insert/delete block 204. The output of each idle insert/delete block 206 is in the form of a stream of 66-bit blocks and is provided to calendar function 208.

The calendar function 208 arranges 66-bit blocks from each idle insert/delete block for scheduling for transmission on the PHYs of a FlexE group. The calendar function provides a respective sub-calendar 210 for each PHY 212 of n PHYs in the FlexE group. Each sub-calendar 210 comprises 66-bit blocks for transmission on a respective PHY 212 of the FlexE group.

The calendar has a granularity of around 5 Gbps, and has a length of 20 slots per 100 Gbps of FlexE group capacity. Therefore, for example, where a FlexE group is made up of n 100 Gbps PHYs, the length of the calendar is 20 n slots. Each slot carries a 66-bit block. Two calendar configurations are supported: an "A" and a "B" calendar configuration. At any given time, one of the calendar configurations is used for mapping data clocks from the FlexE clients into the calendar. The two calendar configurations are provided to facilitate reconfiguration.

The sub-calendar for a PHY includes a repeating assignment of twenty 66-bit blocks to the FlexE client flows (data from FlexE clients) that are being carried on that PHY. The slots are numbered 0-19. The blocks transmitted on each PHY also include overhead blocks. One 66-bit overhead block is inserted for every 1023 repetitions of the sub-calendar (i.e. after every 1023×20 66-bit data blocks). Eight 66-bit overhead blocks comprise an overhead frame. 32 overhead frames comprise an overhead multiframe.

An overhead multiframe is arranged as follows. The first 66-bit block in an overhead frame in the multiframe has the value 0x4B in bits 0-7 and 0x5 in bits 32-35. These two values indicate that the block is the first block in an overhead frame. Each overhead frame also indicates the FlexE group number in which the PHY belongs (that is, the overhead frame is received on a particular PHY, and the PHY is in a FlexE group indicated by the group number). The second overhead block (transmitted 1023 sub-calendar repetitions later than the first overhead block) carries PHY information, including a PHY map. There can be 254 PHYs combined in a group (with identification 1-254), and each bit in the 256-bit PHY map indicates whether a PHY with that number exists in the FlexE group. Each overhead frame includes eight bits of the PHY map, and so all of the second overhead frame blocks of the 32-frame overhead multiframe transmit the complete PHY map. The second block of the overhead frame also indicates the PHY number (0-255) of the PHY carrying the overhead frame. Alternatively, the second block of the overhead frame indicates the instance number of the PHY instance carrying the overhead frame. An instance is a 100 Gbps portion of a physical layer (PHY) of a FlexE connection. If the PHY is a 100 Gbps PHY, the instance and the PHY may be synonymous. If, for example, the PHY is a 200 Gbps or 400 Gbps PHY, the PHY includes multiple instances (e.g. four 100 Gbps instances for a 400 Gbps PHY).

The third block in an overhead frame carries the client distribution information, i.e. the client numbers to which each slot in the 20-slot sub-calendar is assigned. This can also be referred to as the calendar configuration. There are twenty 5 Gbps slots in a sub-calendar for a 100 Gbps PHY, so twenty of the third overhead frame blocks in an overhead multiframe are used to indicate which client data each slot carries. There are two calendar configurations, "A" and "B", and so the overhead multiframe indicates, for each of the 20 slots, which client has been assigned that slot for both calendar configurations. The overhead frame also indicates which calendar configuration is currently in use. The bit indicating the calendar in use is repeated three times in the frame to counter transmission errors. Blocks four to eight of the overhead frame are currently reserved for management data. As there are 20 calendar slots, the calendar configuration is included within the first 20 overhead frames of an overhead multiframe. In the remaining 12 frames of the overhead multiframe, the fields used for calendar configuration are reserved.

An overhead block contains a Calendar switch Request (CR) bit that can be used by a sending entity (e.g. sending FlexE shim) to send a request to the receiving entity (e.g. Receiving FlexE shim) that a calendar configuration (A or B configuration) other than the one currently being used should be used. An overhead block also contains a Calendar switch Acknowledge (CA) bit used to acknowledge the calendar configuration switch in the reverse direction (i.e. the CA bit is in overhead sent over the PHY in the reverse direction).

The first block in an overhead frame can be used to align incoming data, e.g. determine the slot number of frames following the overhead frame, and determine the slot and overhead frame number for subsequent overhead frames.

Figure 3:
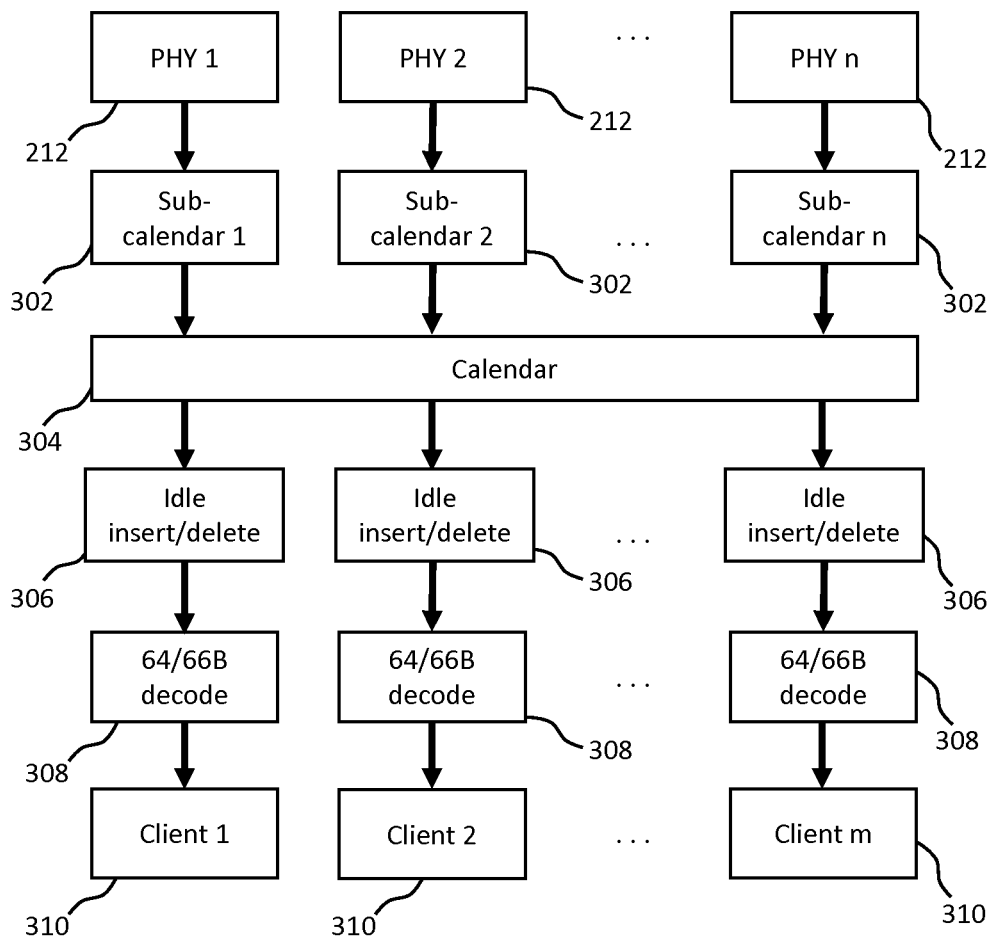
FIG. 3 is a schematic illustration of an example of functions of a FlexE demultiplexer.

FIG. 3 shows an example of functions of a FlexE demultiplexer (FlexE demux), or receiver, one or more of which may be implemented by a FlexE shim. 66-bit blocks of data are received from each of n PHYs 212 and provided to respective sub-calendars 302. These are arranged into a calendar 304 that may in some implementations be identical to the calendar 208 shown in FIG. 2. The 66-bit blocks from the calendar (not including overhead blocks) are provided to the appropriate idle insert/delete blocks 306, each of which is associated with a client flow for a client. The idle insert/delete blocks may delete idle control blocks from the stream of blocks from the calendar 304. The output of each idle insert/delete block 306 is provided to a respective 64/66B decode block 308, which decodes the 66-bit blocks into 64-bit data blocks, and provides the 64-bit blocks to the respective one of m clients 310.

Each client 310 is associated with one of the clients 202 shown in FIG. 1, and associated clients communicate in a bi-directional manner. Therefore, for example, a FlexE shim at one end of the PHYs includes a FlexE mux and a demux, and similarly a FlexE shim at the other end of the PHYs also includes a mux and a demux. Associated clients are identified using the same identifier (e.g. client number) in the calendar client distribution information in the overhead going in both directions between the shims.

The information comprising the PHY map and calendar client distribution information (for both calendars) can be used by a FlexE demux to check that the demux is correctly assigning time slots in which data is received to the correct client, and thus to check that the received data is going to the correct client. The information can also be used by the demux to reconfigure the calendar that is not in use (A or B), as the demux can configure the calendar that is not in use using the information in the overhead. The information is sent to the demux in the overhead by a FlexE mux, and may also be determined by the FlexE mux or a system operator.

The calendar slots, or slots, associated with (e.g. allocated to) a particular FlexE client are not chosen by the FlexE client, and may be chosen for example by the FlexE shim or system operator. Furthermore, the calendar slots associated with a particular FlexE client may vary over time. Therefore, it is not possible for the client to control or determine which particular calendar slots are used.

FlexE is based on the buffering and calendaring of client signals into 66/64 bits time-slots. As part of this process, the FlexE clients are fitted into the FlexE shim at their own carrier clocks. Clock adaptation is done in the shim by padding and justification within the FlexE frame. This process may lead to loss of synchronization information between two client end points. It is not possible to carry independent synchronization information for each client source as all egress clients are all aligned to the FlexE carrier frame. Currently, client synchronization (frequency, phase and time) can be recovered using PTP or other layer 2 synchronization techniques in the nodes attached to the FlexE network. This method is dependent on layer 2 methodology and applicable only to Ethernet clients.

Embodiments as disclosed herein provide the means to carry synchronization information for each client signal independently, allowing for example to connect client networks with independent synchronization sources, keeping their sources segregated and allowing implementation of fully transparent slicing of FlexE network. This case applies for instance to a FlexE network carrying both mobile traffic with strict time and phase requirements together with fixed residential traffic or backhaul traffic without any strict synchronization requirements, and therefore may in some examples be provided by simpler hardware not supporting frequency, time and phase synchronization. Additionally, existing solutions do not include the option to carry a frequency synchronization source without an Ethernet client signal.

In some embodiments of this disclosure, a new type of client, sync clients, are suggested that are different from standard FlexE clients. A sync client may be used for example to transport synchronization information, for example synchronization information of a FlexE client (or a group of them if all clients of the group have the synchronization reference). The sync client transmits synchronization information, and not data traffic; whereas the FlexE clients are transmitting data traffic. Synchronization information relating to other types of clients is possible, such as for example transmitting a clock (e.g. 2.048 MHz clock) that is not related to any payload client. As such, a sync client may carry synchronization information relating to a FlexE client, and/or, a sync client may carry synchronization information which does not relate to a FlexE client.

The transmission of synchronization information is achieved in some examples by extending the current FlexE Shim with the introduction of a new function, called a sync coder and decoder, at the transmitter and receiver side, respectively. The sync coder function maps timing information of the sync clients in the FlexE payload, by periodically adding, according to the client clock, time markers in selected calendar slots of the FlexE shim. Synchronization information, generated by the sync client interface, may for example be converted into one or a sequence of unique 64B/66B blocks. The blocks may for example be allocated and transmitted in the first available slot, pre-empting normal traffic timeslots (e.g. data from standard FlexE clients), in order to minimize the latency. As such, the sync client blocks take priority over the FlexE data blocks, and may be transmitted instead of a FlexE data block.

Figure 4:
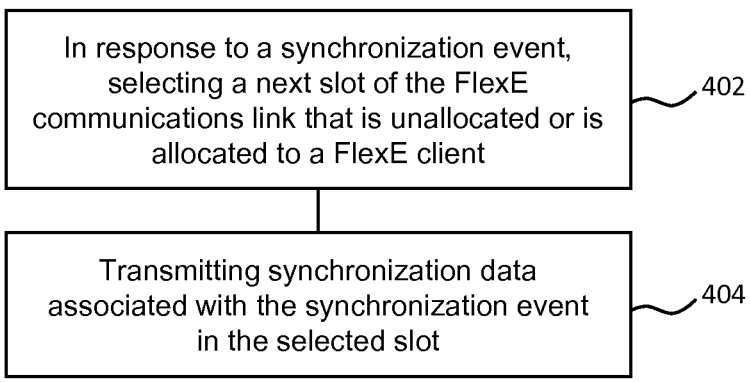
FIG. 4 is a flow chart of an example of a method of transmitting synchronization data over a FlexE communications link.

FIG. 4 is a flow chart of an example of a method 400 of transmitting synchronization data over a FlexE communications link. The method 400 may be performed by for example a FlexE shim. The method 400 comprises, in step 402, in response to a synchronization event, selecting a next slot of the FlexE communications link that is available, e.g. unallocated or is allocated to a FlexE client. The slot may be for example a slot that would have otherwise contained data e.g. from a FlexE client to which that slot is allocated in the FlexE calendar, or may have otherwise contained no data or an idle block if it is unallocated in the FlexE calendar. As such, the synchronization information may be transmitted in a slot previously, or expected to be, allocated to a data carrying client.

The synchronization event may be for example an indication or notification from a device that a synchronization event has occurred or that synchronization data associated with the synchronization event is available for transmission over the FlexE communications link. In some examples, a synchronization event may be a determination or a realization that a certain number of clock cycles have been generated by or received from a device (e.g. sync client). This may be determined e.g. by counting the clock cycles, or receiving a signal or interrupt from a device (e.g. sync client) that the certain number of clock cycles have occurred. If substantially the same number of clock cycles is counted each time, the synchronization event may occur periodically. The device may comprise for example a new type of FlexE device, referred to as a FlexE synchronization client (or sync client). In some examples, the method 400 may include detecting the synchronization event, e.g. detecting or receiving the indication, notification or synchronization data.

In some examples, the synchronization event is based on a synchronization frequency, the synchronization frequency providing the synchronization. The synchronization events may be generated at a reduced, or divided, frequency from the synchronization frequency. The synchronization events may be indicated, i.e. received or generated at the transmitter, at a frequency or rate which provides for synchronization by indicating the synchronization frequency to the receiver. For example, a synchronization event may indicate a number of cycles of the synchronization frequency have elapsed, e.g. 1000 cycles. The present disclosure provides for sending these synchronization events to the receiver in a manner which provides for synchronization. In particular, the timing of the synchronization blocks, i.e. the timing of the slot used for the transmission, provides the timing which indicates synchronization information. As such, it is the transmission of the sync block itself which is used for synchronization, the information carried in the sync block is for identification of the synchronization event, and optionally an offset to the actual transmission time/slot. Thus, the time, or slot, of the physical transmission of the sync client block provides for synchronization. The transmission of the sync client blocks (i.e. in the next available slot) is independent of the FlexE frame timing. The slot used is independent of an allocation or channel of a particular data (i.e. FlexE) client. Thus, the next available slot used for synchronization information is not associated with slots reserved for a particular data client. This independence provides for carrying synchronization information for one or a plurality of data clients and/or a synchronization information not related to a data client.

In some examples, transmitting the synchronization data as soon as possible, e.g. in the next slot that is unallocated or is allocated to a FlexE client, instead of in a particular reserved slot that is reserved for the synchronization data, may reduce jitter. In some aspects, the transmission of the sync clients in the next available slot provides for an accurate transmission of the synchronization information, and not related to the FlexE frame timing. For example, the synchronization event is signalled on the next available slot, where a slot is considered available for the synchronization event even if a data client would otherwise be scheduled in that slot. Additionally or alternatively, if the synchronization data has a low rate compared to the rate of a reserved slot, the slot may instead be reserved to a FlexE client or other device References to the selecting of a next slot "in response to" the synchronization event may refer to an identification of the next slot available for transmission following a synchronization event. Thus, the "response to" indicates a timing order, i.e. identification or notification that a synchronization event has occurred, and an allocation of an immediately following slot to carry the sync information corresponding to that synchronization event.

The next slot that is available, i.e. unallocated or is allocated to a FlexE client, may in some examples considered to be the next slot (following the synchronization event, or following determining that the synchronization event has occurred) that is "available." Here, a slot being available means that it is not scheduled to carry any information (e.g. is not allocated to a FlexE client), or was intended to be allocated to a FlexE client. If the selected slot is allocated to a FlexE client, in some examples any data that would have been transmitted over the FlexE communications link from that FlexE client in that time slot may instead be postponed to the next calendar slot allocated to that FlexE client. In some examples, the delay in transmitting the client data (i.e. non-synchronization data) may be absorbed by other factors, such as for example gaps between Ethernet frames if the data from the FlexE client comprises Ethernet data. In some examples, a slot may be considered as "unavailable" if it contains or is scheduled to carry FlexE overhead data or other synchronization data (e.g. relating to other synchronization events, which may be from one or more other devices or relate to other FlexE clients or synchronization source). In some aspects, a slot may be considered unavailable if there is insertion of PCS alignment markers. In this case, the sync client is transmitted in the next available slot. Thus, in some examples, selecting the next slot that is "available", i.e. unallocated or is allocated to a FlexE client, may comprise selecting the next slot that is allocated to a FlexE client (e.g. the selected slot happens to be allocated to the FlexE client in the FlexE calendar) and not allocated to a type of information considered to take priority, e.g. FlexE overhead, other synchronization client and/or PCS alignment marker. The method further comprises transmitting data scheduled for transmission in the selected slot in a next FlexE calendar slot allocated to the FlexE client following the selected slot. As such, the sync client is transmitted in the first available slot, and a data client is moved to a later slot. The sync client is not transmitted in a predetermined or pre-allocated slot.

Step 404 of the method 400 comprises transmitting synchronization data associated with the synchronization event in the selected slot. The synchronization data may indicate that a synchronization event has occurred, or may be received from a source such as for example the source of a notification that a synchronization event has occurred.

In some examples, if the next slot is unavailable, a later slot may be selected that is available. Therefore, if the selected slot is not the next slot following the synchronization event, the method 400 may comprise including an indication in the synchronization data that indicates an offset between the next slot following the synchronization event and the selected slot. Thus for example the indication may indicate a number of slots between the next slot following the event and the selected slot. This information could be used at the receiving end to for example determine the timing of the synchronization event more accurately, for example by determining that is has received the synchronization information later due to unavailability of an earlier slot. Alternatively, in some examples, the method 400 may comprise including an indication in the synchronization data that indicates an offset between the synchronization event and the selected slot. In any case, in some examples, the offset may indicate for example a number of slots between the next slot following the synchronization event and the selected slot, or may indicate a delay with finer granularity.

References to selecting a next slot of the FlexE communications link that is unallocated or is allocated to a FlexE client may be considered as a reference to selecting a next slot of the FlexE communications link which is available, i.e. selecting a next available slot.

In some examples, the synchronization data transmitted in the selected slot comprises an Ethernet control block and/or a 66-bit block. For example, a 66-bit Ethernet control block may comprise the information illustrated in the following table:

| Bit | | | | | | | |
| --- | --- | --- | --- | --- | --- | --- | --- |
| 65 | 64 | 63-56 | 55-48 | 47-40 | 39-32 | 31-28 | 27-0 |
| 1 | 0 | 0x4B | D1 | D2 | D3 | 0x6 | 0x000 0000 |

Thus, for example, the FlexE shim at the receiving end may detect that the received block is a control block instead of another block such as for example FlexE client data or an idle block. Bits 63-56 have a value of 0x4B indicating an ordered set Ethernet control block, and bits 31-28 have the value of 0x6. The values D1, D2 and D3 may include information associated with the synchronization event. For example, D1 may indicate a sync client ID (e.g. 6 bits). Examples may include a plurality of sync clients, which are identified with the sync client ID. D2 may indicate an event ID (e.g. 8 bits). The event ID may indicate a sequence of the synchronization events transmitted. Thus, if a synchronization event is not received, the receiver may determine this from the event ID being missing. D3 (e.g. 6 bits) may optionally indicate an offset (e.g. as suggested above), e.g. in timeslot or finer granularity. Thus, the timing of the slot used for transmission may be corrected by the offset.

However, the synchronization data illustrated here is merely an example, and any format for the synchronization data may be used. The synchronization data may provide information identifying the sync client, without carrying information about the synchronization timing itself. As such, the timing of the selected slot indicates the synchronization. In a further example, offset information provides additional timing information. In some examples, the offset information is used only if the next slot following a synchronization event is not available. In further examples, the offset information is always used or never used.

In some examples, the control block further comprises a Sync Client status (e.g. active, faulty, holdover), for example in 4 bits. In some examples, Bit 27-0 can be left all 0's or used for other functions (e.g. additional sync client O&M, timestamp).

FIG. 5 is a flow chart of a method 500 of receiving synchronization data over a FlexE communications link. The method 500 may in some examples be performed by a FlexE shim. The method 500 comprises, in step 502, receiving, in a slot of the FlexE communications link that is unallocated or is allocated to a FlexE client, synchronization data (e.g. control block as described herein) associated with a synchronization event. The synchronization data may in some examples be sent to the entity (e.g. shim) performing the method 500 for example using the method 400 describe above.

In some examples, the slot in which the synchronization data is received does not include FlexE overhead data and/or other synchronization data. For example, other synchronization data or overhead data was not scheduled for that slot.

The synchronization data may in some examples include an indication of an offset between the synchronization event and the slot, for example as suggested above. This may allow the entity performing the method, or a device such as a sync client, to determine a delay in receiving the synchronization data, for example due to unavailability of earlier slots (e.g. because they contained overhead data or other synchronization data). In some aspects, the offset may be used even if the sync information is transmitted in the next slot, i.e. the next slot was available. In either case, the determined delay may be used to for example refine the synchronization derived from the synchronization data and/or the timing thereof.

In some examples, the slot is allocated to a FlexE client, and the method 500 comprises receiving data scheduled within the slot in a next FlexE slot allocated to the FlexE client following the slot. Thus there may be for example an additional delay for the data from the FlexE client, though this may in some examples be absorbed by other factors.

FIG. 7 is a schematic of an example of apparatus 600 for transmitting synchronization data over a FlexE communications link. The apparatus 600 comprises processing circuitry 602 (e.g. one or more processors) and a memory 604 in communication with the processing circuitry 602. The memory 604 contains instructions executable by the processing circuitry 602. The apparatus 600 also comprises an interface 606 in communication with the processing circuitry 602. Although the interface 606, processing circuitry 602 and memory 604 are shown connected in series, these may alternatively be interconnected in any other way, for example via a bus.

In one embodiment, the memory 604 contains instructions executable by the processing circuitry 602 such that the apparatus 600 is operable to, in response to a synchronization event, select a next slot of the FlexE communications link that is unallocated or is allocated to a FlexE client, and transmit synchronization data associated with the synchronization event in the selected slot. In some examples, the apparatus 600 is operable to carry out the method 400 described above with reference to FIG. 4.

FIG. 7 is a schematic of an example of apparatus 700 for receiving synchronization data over a FlexE communications link. The apparatus 700 comprises processing circuitry 702 (e.g. one or more processors) and a memory 704 in communication with the processing circuitry 702. The memory 704 contains instructions executable by the processing circuitry 702. The apparatus 700 also comprises an interface 706 in communication with the processing circuitry 702. Although the interface 706, processing circuitry 702 and memory 704 are shown connected in series, these may alternatively be interconnected in any other way, for example via a bus.

In one embodiment, the memory 704 contains instructions executable by the processing circuitry 702 such that the apparatus 700 is operable to receive, in a slot of the FlexE communications link that is unallocated or is allocated to a FlexE client, synchronization data associated with a synchronization event. In some examples, the apparatus 700 is operable to carry out the method 500 described above with reference to FIG. 5.

Advantages of embodiments of this disclosure include the preservation of client signal synchronization over a FlexE/G.mtn transport network so that the FlexE network acts as a fully transparent underlay network with respect to any carried client. This may be particularly relevant when dealing with for example:

1) Fronthaul networks which demand very strict synchronization and latency requirements. A fronthaul network may carry radio data to connect a baseband processing unit with one or more remote radio units, to perform the functions of a base station in a radio access network.
2) Networks supporting different vendors or tenants, with different synchronization sources.
3) Xhaul or fixed-mobile converged networks, where time-sensitive traffic is carried together with backhaul or residential traffic. In some examples, the time-sensitive Xhaul traffic is radio data, e.g. digitized radio data for transmission/as received, for example, in CPRI format.

Embodiments of the present disclosure may not interact and can coexist with overlay synchronization mechanisms such as PTP as it fully resides in the FlexE transport network. From a synchronization perspective, the FlexE network implementing embodiments of this disclosure appears as a point-to-point link interconnecting the sync client nodes, significantly simplifying the design of the overall sync network. For example, a separate layer 2 synchronization protocol is not required. In some aspects, the disclosure provides a FlexE layer synchronization solution. Additionally or alternatively, for example, data or information relating to multiple synchronization sources may be carried over a common FlexE section, allowing for simplification of multi-tenant networks.

Figure 8:
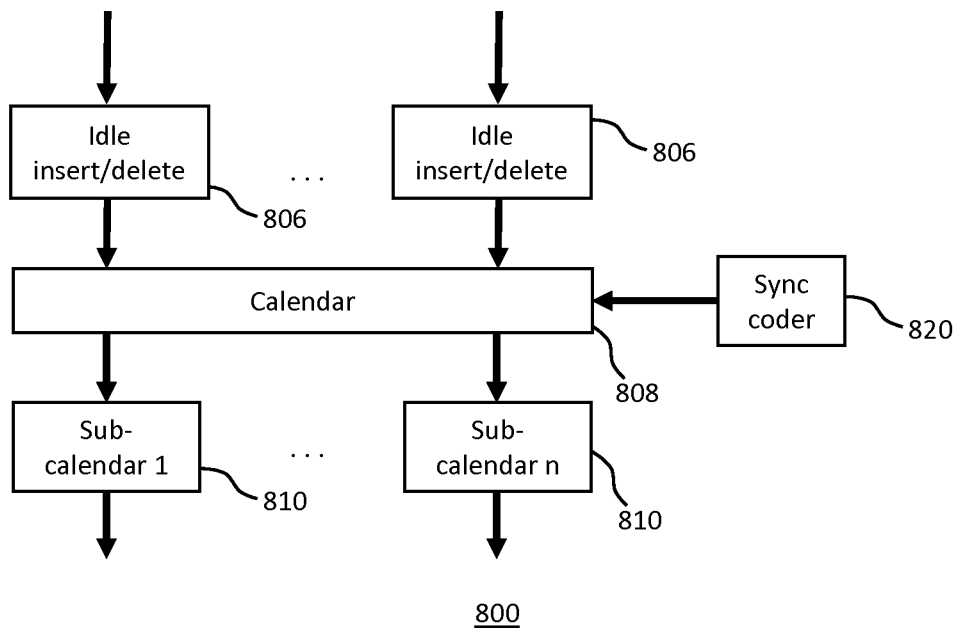
FIG. 8 is a schematic illustration of part of a FlexE multiplexer.

FIG. 8 is a schematic illustration of part of a FlexE multiplexer 800, for example on a synchronization (sync) data transmission side of a FlexE communications link. The FlexE multiplexer 800 may be similar to the multiplexer 200 of FIG. 2, and includes a number of idle insert/delete blocks 806, a calendar 808, and a number of sub-calendar blocks 810. However, the multiplexer 800 also includes a sync coder 820 that interacts with the calendar 808 to insert synchronization data corresponding to synchronization events. The sync client blocks are not restricted to association with a particular sub-calendar, and are inserted into any slot which is next available.

Figure 9:
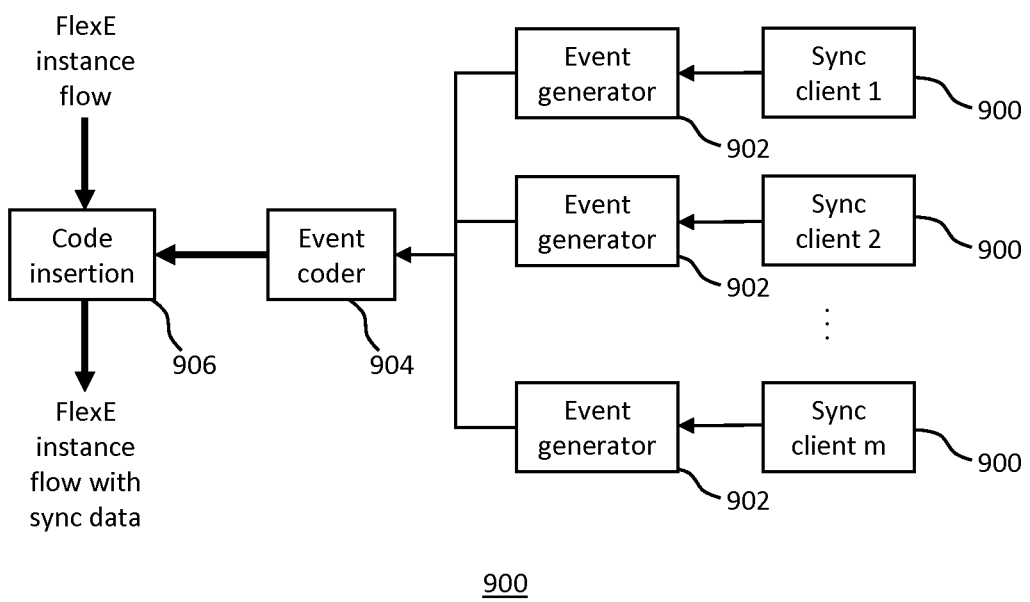
FIG. 9 shows an example of the sync coder of FIG. 8 in more detail.

FIG. 9 shows an example of the sync coder 820 of FIG. 8 in more detail. The sync coder 820 includes a number of sync clients 900 (though other examples may include one or more sync clients), each with an associated event generator 902 to generate a sync event based on the corresponding sync client. The sync events are provided to event coder 904 to generate sync data (e.g. sync control blocks) which is provided to code insertion block 906. The code insertion block 906 inserts the sync data into FlexE instance flow (e.g. calendar), including overhead, to provide FlexE instance flow (including overhead) with sync data.

Each sync client 900 (and corresponding event generator 902) may generate synchronization events with a respective frequency, which may vary between sync clients. Event generators 902 may for example create periodic events derived from the received sync client frequency, with a periodicity sufficient to regenerate the synchronization frequency on the Rx side (for example, about 10-100 events/sec). The event generators 902 may be for example frequency dividers. The code insertion block 906 receives sync data (e.g. control blocks) and inserts the sync data immediately (or in the next available slot, including those slots allocated to standard FlexE clients) in the FlexE frame or calendar. If the slot selected to contain sync data is allocated to a FlexE client, the impacted FlexE client port may be notified in some examples to hold data transmission until the next calendar timeslot allocated to that FlexE client.

Figure 10:
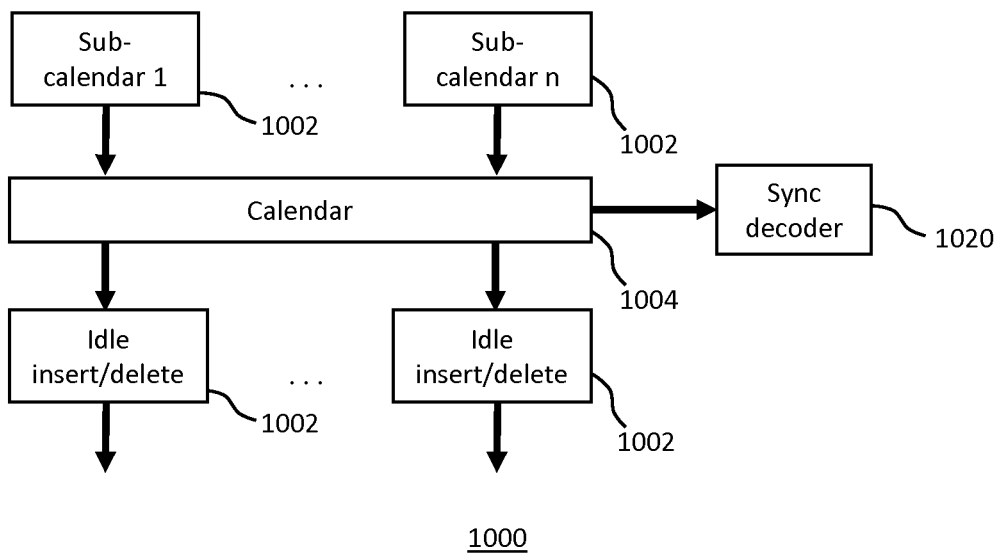
FIG. 10 is a schematic illustration of part of a FlexE demultiplexer.

FIG. 10 is a schematic illustration of part of a FlexE demultiplexer 1000, for example on a synchronization (sync) data receiving side of a FlexE communications link. The FlexE demultiplexer 1000 may be similar to the demultiplexer 300 of FIG. 3, and includes a number of sub-calendar blocks 1002, a calendar 1004, and a number of idle insert/delete blocks 1006. However, the multiplexer 1000 also includes a sync decoder 1020 that interacts with the calendar 808 to extract synchronization data corresponding to synchronization events. The sync decoder provides for (re)generating the synchronization signal (i.e. frequency) based on the synchronization information received (i.e. timing of the sync block transmissions and optionally additional information, e.g. the offset).

Figure 11:
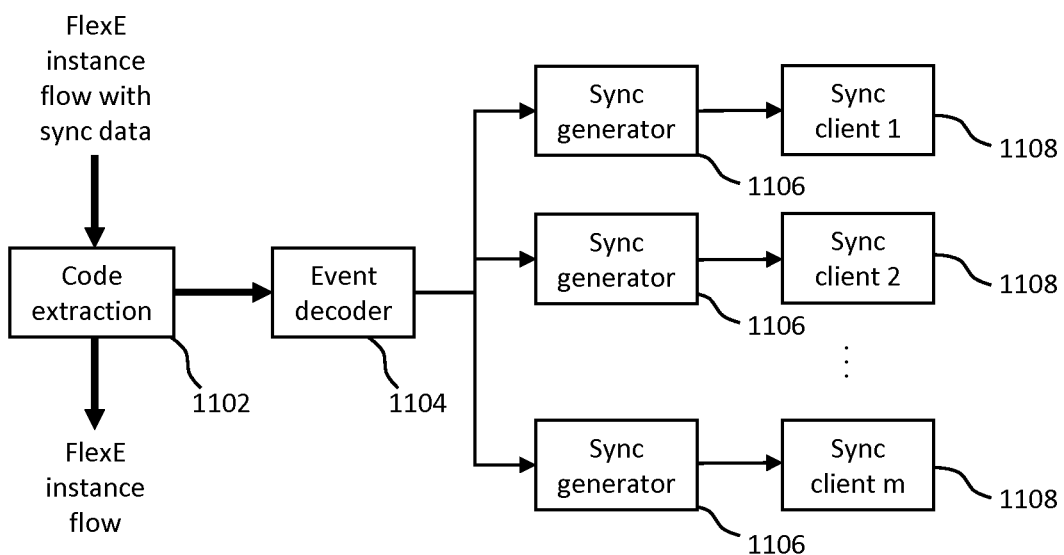
FIG. 11 shows an example of the sync decoder of FIG. 10 in more detail.

FIG. 11 shows an example of the sync decoder 1020 of FIG. 10 in more detail. The sync decoder 1020 includes code extraction block 1102 to extract sync data (e.g. control blocks) from FlexE instance flow (including overhead) with sync data. The sync data is provided to event decoder 1104 to provide the sync data to the appropriate sync generator 1106, each of which is associated with a sync client 1108.

The sync generators 1106 may each provide for example a clock or number of events at an appropriate frequency corresponding to the associated sync client 1108. Thus, synchronization to the transmitted sync client is achieved. In some examples, the sync generators 1106 each include a PLL (Phase Locked Loop) that can regenerate the sync client clock frequency based on the received sequence or frequency of events from the event decoder 1104.

It should be noted that the above-mentioned examples illustrate rather than limit the invention, and that those skilled in the art will be able to design many alternative examples without departing from the scope of the appended statements. The disclosure uses FlexE as an example, however, the features of the disclosure may apply to other data transport protocols. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of transmitting synchronization data over a FlexE communications link, the method comprising:
   in response to a synchronization event, a FlexE shim selecting a subsequent slot of the FlexE communications link that is one of unallocated and allocated to a FlexE client;
   the FlexE shim transmitting synchronization data associated with the synchronization event in the selected subsequent slot of the FlexE communications link comprising adding time markers in calendar slots of the FlexE shim, the transmission of the synchronization data pre-empting other data traffic; and
   if the selected subsequent slot of the FlexE communications link is not a first next slot following the synchronization event, including an indication in the synchronization data that indicates an offset between the next slot following the synchronization event and the selected subsequent slot of the FlexE communications link.

2. The method of claim 1, wherein selecting the subsequent slot comprises one or more of selecting a second next slot that does not include FlexE overhead data, and selecting a third next slot that does not include other synchronization data.

3. The method of claim 1, wherein the offset indicates a number of slots between the next slot following the synchronization event and the selected subsequent slot of the FlexE communications link.

4. The method of claim 1, wherein selecting the subsequent slot comprises selecting a next slot that is allocated to a FlexE client, and the method comprises transmitting data scheduled for transmission in the selected subsequent slot of the FlexE communications link in a next FlexE slot allocated to the FlexE client following the selected subsequent slot of the FlexE communications link.

5. The method of claim 1, wherein the synchronization data comprises one or more of an Ethernet control block and a 66-bit block.

6. The method of claim 2, wherein selecting the subsequent slot that is one of unallocated and allocated to a FlexE client comprises selecting a fourth next slot that does not include other synchronization data.

7. A method of receiving synchronization data over a FlexE communications link, the method comprising:
a FlexE shim receiving, in a slot of the FlexE communications link, the synchronization data associated with a synchronization event, transmission of the synchronization data having pre-empted other data traffic;
the FlexE shim receiving synchronization data comprising time markers in calendar slots of the FlexE shim; and
the synchronization data including an indication of an offset between a next slot following the synchronization event and the slot of the FlexE communications link.

8. The method of claim 7, wherein one or more of:
the slot of the FlexE communications link does not include FlexE overhead data; and
the slot of the FlexE communications link does not include other synchronization data.

9. The method of claim 7, wherein the synchronization data comprises one or more of an Ethernet control block and a 66-bit block.

10. An apparatus for transmitting synchronization data over a FlexE communications link, the apparatus comprising a processor and a memory, the memory containing instructions executable by the processor such that the apparatus is configured to:
in response to a synchronization event, a FlexE shim selecting a subsequent slot of the FlexE communications link;
the FlexE shim transmitting synchronization data associated with the synchronization event in the selected subsequent slot of the FlexE communications link comprising adding time markers in calendar slots of the FlexE shim, the transmission of the synchronization data pre-empting other data traffic; and
if the selected subsequent slot of the FlexE communications link is not a next slot following the synchronization event, including an indication in the synchronization data that indicates an offset between the next slot following the synchronization event and the selected subsequent slot of the FlexE communications link.

11. An apparatus for receiving synchronization data over a FlexE communications link, the apparatus comprising a processor and a memory, the memory containing instructions executable by the processor such that the apparatus is configured to:
a FlexE shim receiving, in a slot of the FlexE communications link that is one of unallocated and allocated to a FlexE client, synchronization data associated with a synchronization event, transmission of the synchronization data having pre-empted other data traffic;
the FlexE shim receiving synchronization data comprising time markers in calendar slots of the FlexE shim; and
the synchronization data including an indication of an offset between a next slot following the synchronization event and the slot of the FlexE communications link.

* * * * *